United States Patent
Block et al.

(10) Patent No.: US 8,046,924 B2
(45) Date of Patent: Nov. 1, 2011

(54) CUTTING TOOL WITH VARIABLE MECHANICAL ADVANTAGE

(75) Inventors: Andrew Block, Middleton, WI (US); Scott Roelke, Arena, WI (US)

(73) Assignee: Fiskars Brands, Inc., Madison, WI (US)

( * ) Notice: Subject to any disclaimer, the term of this patent is extended or adjusted under 35 U.S.C. 154(b) by 443 days.

(21) Appl. No.: 12/397,193

(22) Filed: Mar. 3, 2009

(65) Prior Publication Data

US 2010/0223794 A1  Sep. 9, 2010

(51) Int. Cl.
*B26B 13/26* (2006.01)
(52) U.S. Cl. .............. 30/249; 30/250; 30/251
(58) Field of Classification Search .......... 30/244, 30/245, 249, 250, 251, 254, 258
See application file for complete search history.

(56) References Cited

U.S. PATENT DOCUMENTS

| | | | |
|---|---|---|---|
| 476,459 A | 6/1892 | Hamann et al. | |
| 764,430 A * | 7/1904 | Crosby | 30/249 |
| 993,646 A * | 5/1911 | Burkeet | 30/250 |
| 1,520,529 A | 12/1924 | Cagle | |
| 1,533,039 A | 4/1925 | Shirk | |
| 1,771,031 A | 7/1930 | Court | |
| 2,528,816 A | 11/1950 | Boyer | |
| 2,557,506 A | 6/1951 | Kovacevich | |
| 2,674,796 A | 4/1954 | Herold | |
| 2,769,237 A | 11/1956 | Oxhandler | |
| 3,760,500 A | 9/1973 | Eads et al. | |
| 4,031,621 A | 6/1977 | Arlett | |
| 4,046,148 A | 9/1977 | Meador | |
| 4,528,707 A | 7/1985 | Aida | |
| D301,537 S | 6/1989 | Pittaway | |
| D301,538 S | 6/1989 | Pittaway | |
| D305,090 S | 12/1989 | Collins et al. | |
| 4,947,553 A | 8/1990 | Bendickson et al. | |
| 4,964,216 A | 10/1990 | Gosselin | |
| 5,020,222 A | 6/1991 | Gosselin et al. | |
| 5,079,801 A | 1/1992 | Peterson | |
| 5,084,975 A | 2/1992 | Melter | |
| 5,159,757 A * | 11/1992 | Weid et al. | 30/251 |
| D336,222 S | 6/1993 | Wensley et al. | |
| D336,412 S | 6/1993 | Wensley et al. | |
| D336,835 S | 6/1993 | Lutzke | |
| 5,241,752 A | 9/1993 | Lutzke et al. | |
| 5,255,438 A | 10/1993 | Morgan | |
| D342,652 S | 12/1993 | Wensley et al. | |

(Continued)

FOREIGN PATENT DOCUMENTS

EP  1 625 784 B1  2/2006

(Continued)

OTHER PUBLICATIONS

International Search Report and Written Opinion for PCT/US2010/020126, mail date Feb. 26, 2010, 7 pages.

Primary Examiner — Hwei C Payer
(74) Attorney, Agent, or Firm — Foley & Lardner LLP (57) ABSTRACT

A hand-operated cutting tool includes first and second cutting members pivotally connected at a first pivot point, a lever having a longitudinal axis and pivotally connected to the first cutting member at a second pivot point, and a translatable curvilinear pivot connection between the lever and the second cutting member.

14 Claims, 6 Drawing Sheets

U.S. PATENT DOCUMENTS

| | | | |
|---|---|---|---|
| 5,267,400 A | | 12/1993 | Danube et al. |
| 5,280,716 A | * | 1/1994 | Ryan et al. .................. 72/409.07 |
| D343,773 S | | 2/1994 | Lutzke |
| D347,771 S | | 6/1994 | Lutzke |
| 5,367,774 A | | 11/1994 | Labarre et al. |
| 5,426,857 A | | 6/1995 | Lindén |
| 5,469,625 A | | 11/1995 | Melter et al. |
| 5,570,510 A | | 11/1996 | Lindén |
| 5,592,743 A | | 1/1997 | Labarre et al. |
| 5,689,888 A | | 11/1997 | Lindén |
| 5,697,159 A | | 12/1997 | Lindén |
| 5,743,018 A | * | 4/1998 | Wang ............................... 30/249 |
| 5,771,584 A | * | 6/1998 | Wang ............................... 30/251 |
| 5,839,195 A | * | 11/1998 | Lin .................................. 30/250 |
| 5,933,965 A | | 8/1999 | Lindén et al. |
| 5,950,315 A | | 9/1999 | Lindén |
| 5,974,670 A | | 11/1999 | Hsieh |
| 6,101,725 A | | 8/2000 | Lindén |
| 6,105,257 A | | 8/2000 | Rutkowski et al. |
| 6,161,291 A | | 12/2000 | DiMatteo et al. |
| 6,199,284 B1 | | 3/2001 | Nilsson et al. |
| 6,202,310 B1 | | 3/2001 | Lindén |
| 6,418,626 B1 | | 7/2002 | Jang |
| 6,446,343 B1 | * | 9/2002 | Huang ............................ 30/249 |
| 6,493,943 B1 | | 12/2002 | Lindèn |
| 6,513,248 B2 | | 2/2003 | Linden et al. |
| 6,711,820 B2 | | 3/2004 | Chen |
| 6,748,663 B2 | | 6/2004 | Lindén |
| 6,785,969 B2 | | 9/2004 | Wang |
| 6,789,324 B2 | | 9/2004 | Lindèn et al. |
| 6,829,828 B1 | | 12/2004 | Cech et al. |
| D501,379 S | | 2/2005 | Lipscomb et al. |
| D503,595 S | | 4/2005 | Lipscomb et al. |
| 7,080,455 B1 | | 7/2006 | Ronan et al. |
| D576,011 S | | 9/2008 | Lipscomb et al. |
| 2002/0046466 A1 | | 4/2002 | Deville |
| 2003/0014868 A1 | | 1/2003 | Cech et al. |
| 2005/0172499 A1 | | 8/2005 | Huang |
| 2008/0276464 A1 | | 11/2008 | Hatch |
| 2009/0044412 A1 | | 2/2009 | Hsieh |

FOREIGN PATENT DOCUMENTS

| | | | |
|---|---|---|---|
| FR | 2 825 573 A3 | * | 12/2002 |
| GB | 605038 A | | 7/1948 |
| GB | 2 375 500 B | | 3/2004 |
| WO | WO 2007/128879 A1 | | 11/2007 |

* cited by examiner

CUTTING TOOL WITH VARIABLE MECHANICAL ADVANTAGE

FIELD

The present invention relates to a hand-operated cutting tool. The present invention relates more particularly to a compound action hand-operated cutting tool having a variable leverage mechanism that provides a variable mechanical advantage throughout the cutting stroke, such that the mechanical advantage increases and decreases as the amount of force required throughout the cutting stroke to cut an object increases and decreases, so that the force applied by a user to the cutting tool throughout the cutting stroke remains relatively constant.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

It is generally known to provide a hand-operated cutting tool for use in pruning or trimming branches and the like, such as a lopper having a pair of pivoting members such as handles that actuate cutting jaws that cooperate to capture and sever a branch between the jaws. Such known loppers typically include a pair of handles pivotally movable between an open and closed position for actuating the cutting jaws between a full open and closed position. The known loppers may also devices intended to increase the available leverage provided by the handles, including levers and/or gears that transmit and increase a force from the handles to the jaws.

As a lopper cuts through an object (e.g. a roughly cylindrical sample of a wood material), the force required to cut increases up to a maximum, at a location approximately 60% through the sample, then decreases at a generally similar rate until approximately 90-95% through the sample where the force required to complete the cutting operation rapidly decreases. Typical cutting tools such as a lopper are sized such that with the tool fully opened, the average human holds the handles with arms abducted and elbows facing outward, and move with a transverse flexion of the arms until the tool is fully closed. There is a reduction in the transverse flexion strength as the arms are abducted and elbows straightened, which tends to result in a decreasing force available from the user where the force required to cut the object is increasing.

Accordingly, it would be desirable to provide a hand-operated cutting tool, such as a lopper, having a variable leverage mechanism that provides a variable mechanical advantage throughout the cutting stroke, such that the mechanical advantage increases and decreases as the amount of force required throughout the cutting stroke to cut an object increases and decreases, so that the force applied by a user to the cutting tool throughout the cutting stroke remains relatively constant.

SUMMARY

According to one embodiment, a hand-operated cutting tool includes a first cutting member with first and second apertures, and a second cutting member including a third aperture, with the second cutting member at least in part overlying the first cutting member so that the third aperture is in general registry with the first aperture. A lever includes a fourth aperture and an arcuate slot. A first pivot connection is provided between the cutting members at the first and third apertures, and a second pivot connection is provided between the lever and the first cutting member at the second and fourth apertures. A projection extends through the arcuate slot, for effecting a point of interaction between the lever and the second cutting member.

According to another embodiment, a hand-operated cutting tool includes first and second cutting members pivotally connected at a first pivot point, a lever having a longitudinal axis and pivotally connected to the first cutting member at a second pivot point, a curved slot on either the lever or the second cutting member, and a projection on the other of the lever or the second cutting member for effecting a point of interaction between the lever and the second cutting member throughout a cutting stroke.

According to a further embodiment, a hand-operated cutting tool includes first and second cutting members pivotally connected at a first pivot point, a lever having a longitudinal axis and pivotally connected to the first cutting member at a second pivot point, and a translatable curvilinear pivot connection between the lever and the second cutting member.

DETAILED DESCRIPTION

Referring to the FIGURES, a hand-operated cutting tool, shown for example as a "lopper" having a pair of handles operable to actuate a pair of cutting members, is illustrated having a variable leverage mechanism that includes a lever device with a curvilinear slot (e.g. arcuate, curved, etc.). The lever is pivotally connected to a first cutting member of the cutting tool at a pivot point and is slidably connected to a second cutting member of the cutting tool along the slot. The configuration of the curvilinear slot in the lever provides an increased mechanical advantage through the portions of the tool's cutting stroke (e.g. from full open to full closed) that correspond to increased force required to cut an object, and provides a decreased mechanical advantage through the portions of the tool's cutting stroke that correspond to decreased force required to cut the object, so that the force required by a user to cut the object remains more constant that the varying force typically required with conventional cutting tools to cut an object.

The present inventors have determined that the resistance to cutting presented by an object such as a generally round, fibrous growth (e.g. tree limb, etc.) varies as a function of the penetration of the cutting members into the growth. The maximum resistance is generally encountered at a predetermined point in the cutting stroke through the maximum-sized object for which the tool is designed. The leverage mechanism is designed to provide maximum leverage (i.e. mechanical advantage) at the point in the cutting stroke corresponding to that maximum resistance.

The respective pivot points and the point of interaction between the second cutting member and the lever device come into alignment in a common plane at a point in the cutting stroke corresponding to the maximum resistance encountered during the cutting stroke through a growth of predetermined diameter. In the illustrated embodiment, the first and second cutting members comprise a hook and a blade, respectively, and maximum leverage is provided in the range of approximately 60 to 62 percent through the cutting stroke. This point of maximum mechanical advantage corresponds to the peak of the mechanical advantage curve ("power curve") of the tool, as will be further described. Further, the pivotal connection between the lever device and the first cutting member (i.e. the hook) is preferably substantially flush with the inner surface of the cutting member to avoid interference with the pivotal movement of the second cutting member (i.e. the blade).

Although specific examples are shown and described throughout this disclosure, the embodiments illustrated in the FIGURES are shown by way of example, and any of a wide variety of other cutting member configurations, lever device and slot configurations, and cutting device types (e.g. snips, pruners, shears, etc.), and actuating devices, and combinations thereof, will be readily apparent to a person of ordinary skill in the art after reviewing this disclosure. All such variations of cutting tools that use the variable leverage mechanism are intended to be within the scope of the invention.

Referring more particularly to FIG. 1A-1D, a hand-operated cutting device, shown for example as a lopper 10, according to an exemplary embodiment. Lopper 10 is shown to include a pair of handles 12 and a pair of cutting members (e.g. jaws, shearing members, etc.). A first cutting member 20 has a first end 22 having a first cutting device 24 (shown for example as a hook) and a second end 26, and a first aperture 28 and a second aperture 30. The second cutting member 40 has a first end 42 having a corresponding second cutting device 44 (shown for example as a blade) that engages the first cutting device 24 in a shearing relationship, and a second end 46, and a third aperture 48. The first cutting member is pivotally coupled to the second cutting member by a first pivot connection 16 (e.g. pivot point, etc.) defined by the first aperture 28 and the third aperture 48.

The lopper 10 is also shown to include a variable leverage mechanism 60 including a lever device 62 with a fourth aperture 64 and a curvilinear slot 66 for providing variable leverage (i.e. variable mechanical advantage) corresponding to the variable force required throughout the cutting stroke to sever an object (i.e. the variable force required by a user holding the handles 12 of the tool 10 to overcome the variable resistance offered by the object held between the cutting members 20, 40 during the cutting operation as the user moves the handles 12 to actuate the cutting members 20, 40 from the open position to the closed position). The lever device 62 is pivotally coupled to the first cutting member 20 at a second pivot connection 18 (e.g. pivot point, etc.) defined by the second aperture 30 and the fourth aperture 64, and is pivotally/slidably coupled to the second cutting member 40 at a sliding (e.g. dynamic, translatable, etc.) pivot connection, shown for example to include a projection 50 (e.g. pin, lug, bolt, stud, etc.) coupled proximate the second end 46 of the second cutting member 40 that traverses within the slot 66, to effect a point of interaction between the lever device 62 and the second cutting member 40.

The first cutting member 20 and the lever device 62 are each shown to include a tang 14 operable to receive a first and second handle 12 (or other suitable extension) for gripping by a user to actuate the cutting members to sever an object. However, any suitable handle arrangement may be used (e.g. integral, separately attached, etc.) according to other embodiments.

Figure 1A:
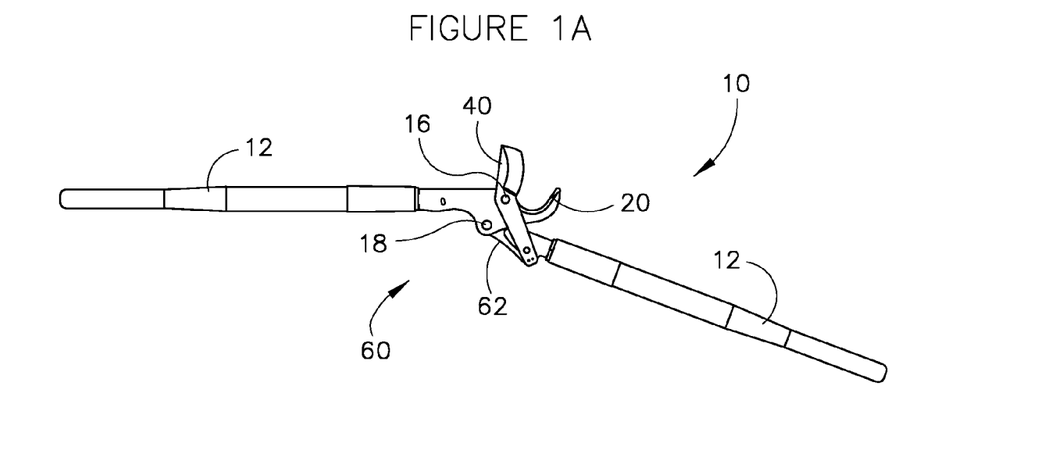
FIG. 1A is a schematic image of a hand-operated cutting tool, such as a lopper, in a full open position (shown with handles approximately 150 degrees apart) according to an exemplary embodiment.
Figure 1B:
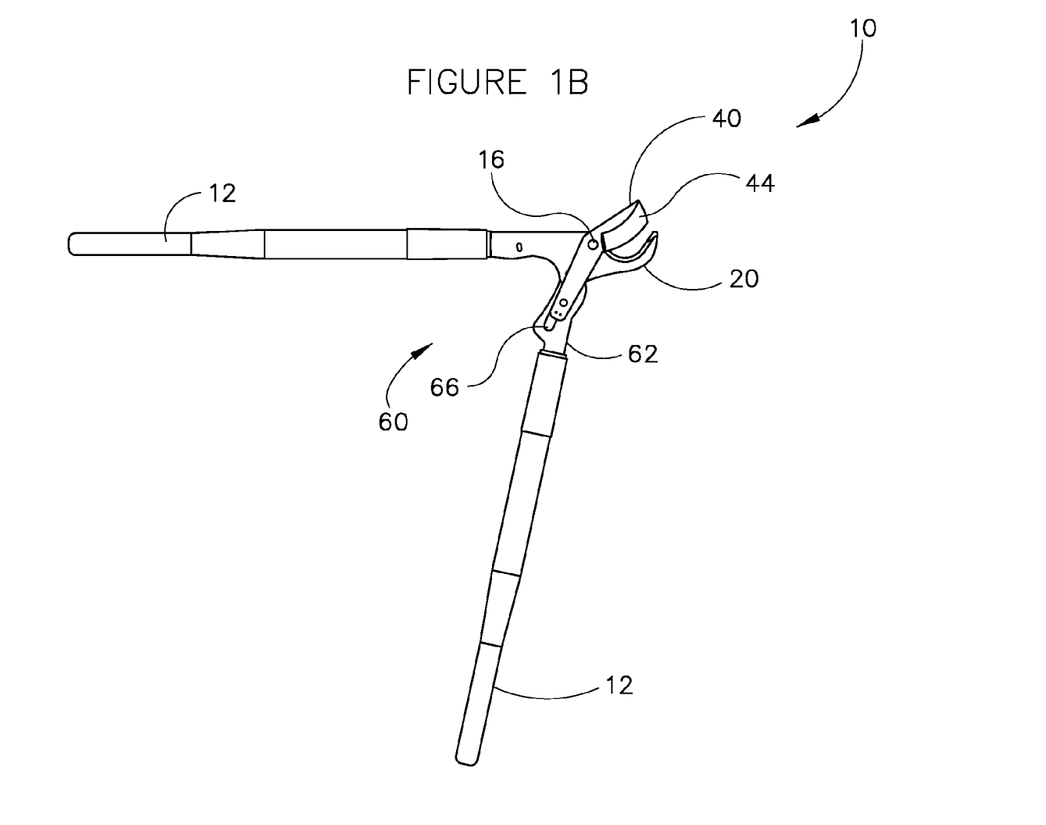
FIG. 1B is a schematic image of a hand-operated cutting tool, such as a lopper, in a further open position (shown with handles approximately 80 degrees apart) according to an exemplary embodiment.
Figure 1C:
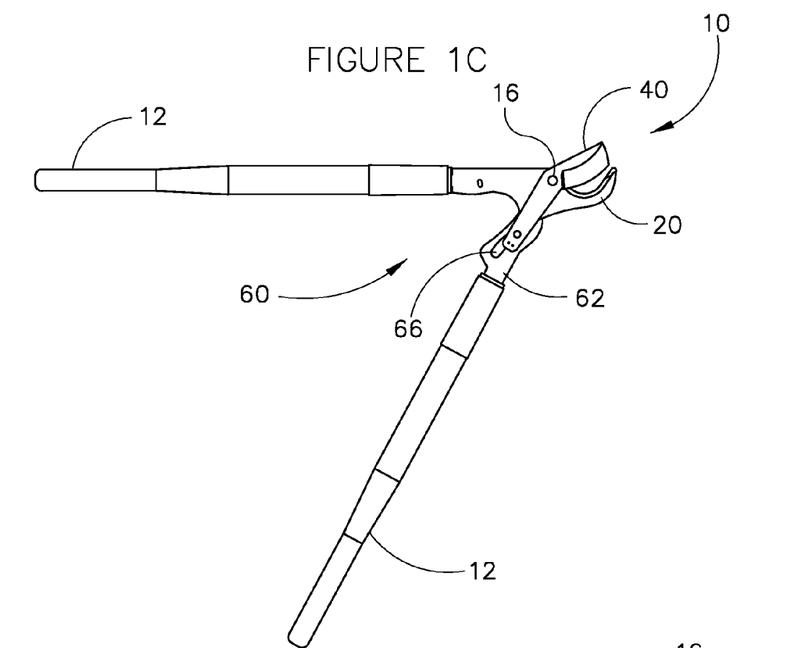
FIG. 1C is a schematic image of a hand-operated cutting tool, such as a lopper, in a partially open position (shown with handles approximately 60 degrees apart) according to an exemplary embodiment.
Figure 1D:
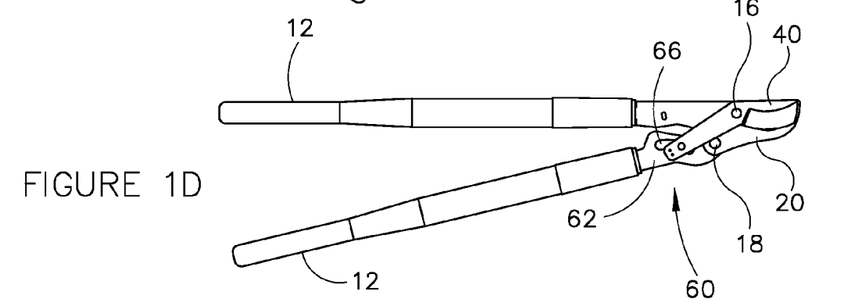
FIG. 1D is a schematic image of a hand-operated cutting tool, such as a lopper, in a full closed position (shown with handles approximately 10 degrees apart) according to an exemplary embodiment.
Figure 2:
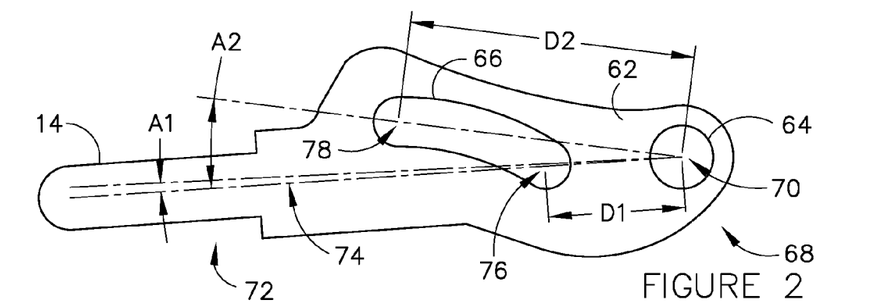
FIG. 2 is a schematic image of a lever device for a hand-operated cutting tool, according to an exemplary embodiment.

Referring to FIG. 2, the lever device 62 of the variable leverage mechanism 60 is shown in further detail according to an exemplary embodiment. Lever device 62 includes a first end 68 having fourth aperture 64 defining a center point 70, and which corresponds to the second pivot connection between the lever device 62 and the first cutting member 20. Lever device 62 also includes a second end 72 having tang 14, and a longitudinal axis 74 defined by a line extending through the tang 14 and the center point 70 of fourth aperture 64. Lever device 62 further includes curvilinear slot 66, shown to include a first end center point 76 and a second end center point 78. According to one embodiment, slot 66 is an arcuate slot defined by a constant slot radius R. Slot radius R is sized to correspond to the size, dimensions and geometry of the other portions of the cutting tool. According to one embodiment, slot radius R is within a range of approximately 2.50 inches-3.00 inches, and more particularly within a range of approximately 2.70 inches-2.80 inches, and more particularly still, slot radius R is approximately 2.75 inches. According to other embodiments, slot radius R may have any other suitable dimension or length. According to further embodiments, slot radius R may be variable (i.e. non-constant) from the first end center point to the second end center point.

Referring further to FIG. 2, the location of slot 66 on the lever device 62 is shown according to an exemplary embodiment. First end center point 76 of slot 66 is shown by way of example as located at a distance D1 from the center point 70 of fourth aperture 64, and at an angle A1 from longitudinal axis. Second end center point 78 of slot 66 is shown by way of example as located at a distance D2 from the center point 70 of fourth aperture 64, and at an angle A2 from the longitudinal axis 74. Distances D1 and D2 and angles A1 and A2 are dependent upon the size and geometry of the cutting device. According to one embodiment, distance D1 is within a range of approximately 1.00 inches-1.50 inches, and more particularly within a range of approximately 1.20 inches-1.3 inches, and more particularly still, distance D1 is approximately 1.25 inches. According to one embodiment, distance D2 is within a range of approximately 2.25 inches-2.75 inches, and more particularly within a range of approximately 2.40 inches-2.65 inches, and more particularly still, distance D2 is approximately 2.56 inches. According to one embodiment, angle A1 is within a range of approximately zero (0) degrees and two (2) degrees, and more particularly, angle A1 is approximately one (1) degree. According to one embodiment, angle A2 is within a range of approximately 10 degrees and 13 degrees, and more particularly, angle A2 is approximately 11.39 degrees. However, according to alternative embodiments, distances D1 and D2, and angles A1 and A2 may be any suitable distance or angle corresponding to the size, shape and geometry of the components of the cutting tool so that a variable mechanical advantage is created that permits a more uniform force applied by a user throughout the cutting stroke to sever an object between the first and second cutting members.

Figure 3:
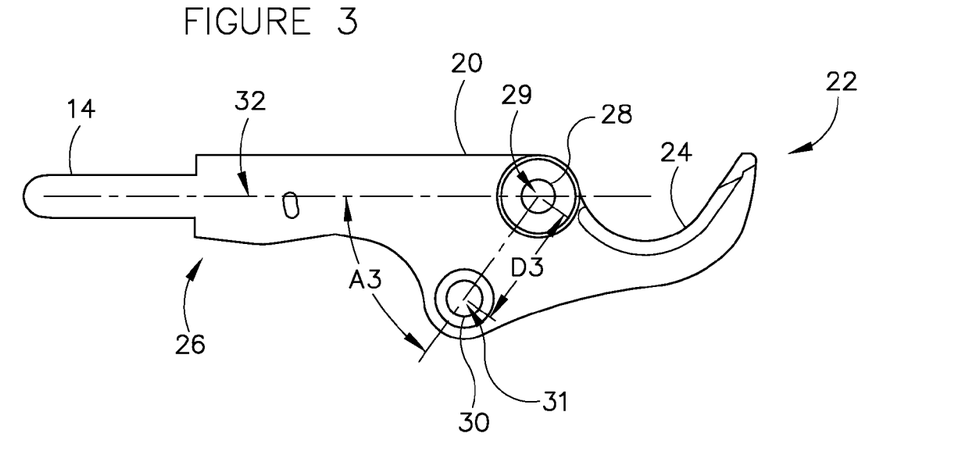
FIG. 3 is a schematic image of a first cutting member for a hand-operated cutting tool, according to an exemplary embodiment.

Referring to FIG. 3, the first cutting member 20 of the cutting tool 10 is shown in further detail according to an exemplary embodiment. First cutting member 20 includes hook portion 24 at the first end 22 and tang 14 at second end 26, and a longitudinal axis 32 defined by a line extending through the tang 14 and a center point 29 of first aperture 28, which corresponds to the first pivot connection. Second aperture 30 corresponding to the second pivot point has a center point 31. The spacing of the first and second pivot points is such that the center point 31 of the second aperture 30 is located a distance D3 from the center point 29 of first aperture 28, and forms an angle A3 with longitudinal axis 32. Distance D3 and angle A3 are dependent upon the size and geometry of the cutting device. According to one embodiment, distance D3 is within a range of approximately 1.50 inches-2 inches, and more particularly within a range of approximately 1.70 inches-1.80 inches, and more particularly still, distance D3 is approximately 1.75 inches. According to one embodiment, angle A3 is within a range of approximately fifty (50) degrees and sixty (60) degrees, and more particularly within a range of approximately fifty-three (53) degrees and fifty-seven (57) degrees, and more particularly, angle A3 is approximately fifty-five (55) degrees. However, according to alternative embodiments, distance D3, and angle A3 may be any suitable distance or angle corresponding to the size, shape and geometry of the components of the cutting tool.

Figure 4:
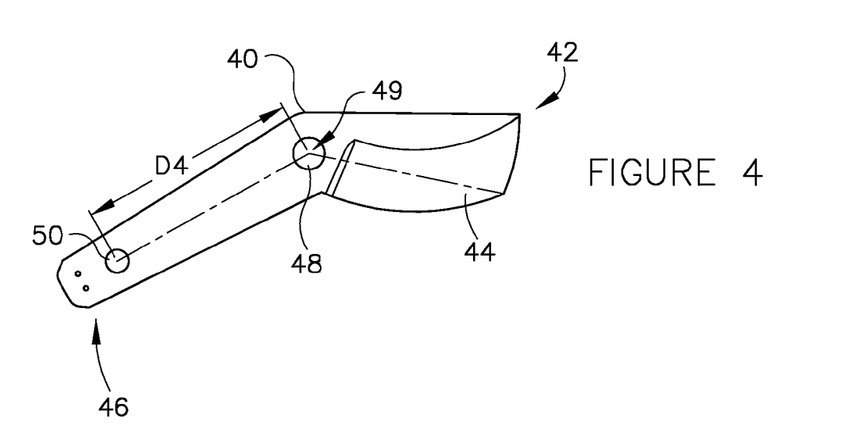
FIG. 4 is a schematic image of a second cutting member for a hand-operated cutting tool, according to an exemplary embodiment.

Referring to FIG. 4, the second cutting member 40 of the cutting tool 10 is shown in further detail according to an exemplary embodiment. Second cutting member 40 includes blade portion 44 at first end 42 and projection 50 disposed proximate second end 46. Second cutting member 40 also includes third aperture 48 having a center point 49 and corresponds to the first pivot connection. The spacing of the center point 49 of the third aperture 48 is located a distance D4 from the center point 51 of projection 50. Distance D4 is dependent upon the size and geometry of the cutting device. According to one embodiment, distance D4 is within a range of approximately 2.50 inches-3.50 inches, and more particularly within a range of approximately 2.75 inches-3.25 inches, and more particularly still, distance D4 is approximately 3.00 inches.

Figure 5A:
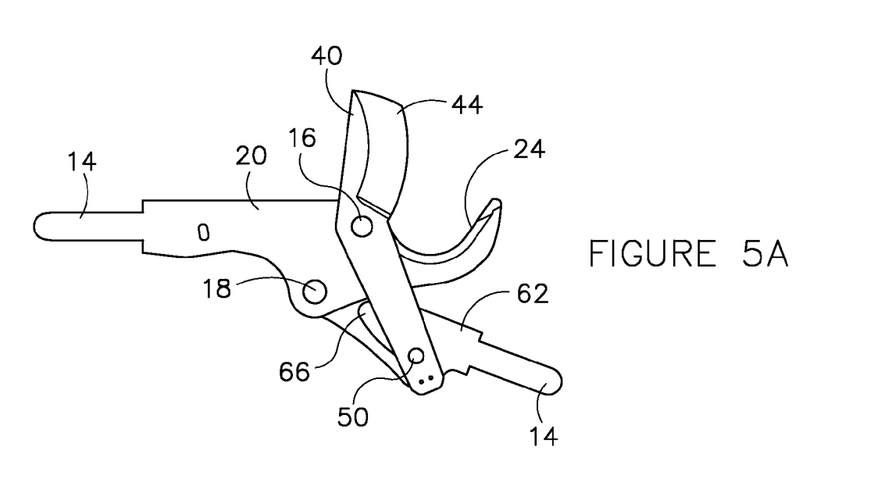
FIG. 5A is a schematic image of a leverage mechanism for a hand-operated cutting tool, such as a lopper, in a full open position according to the exemplary embodiment of FIG. 1A.
Figure 5B:
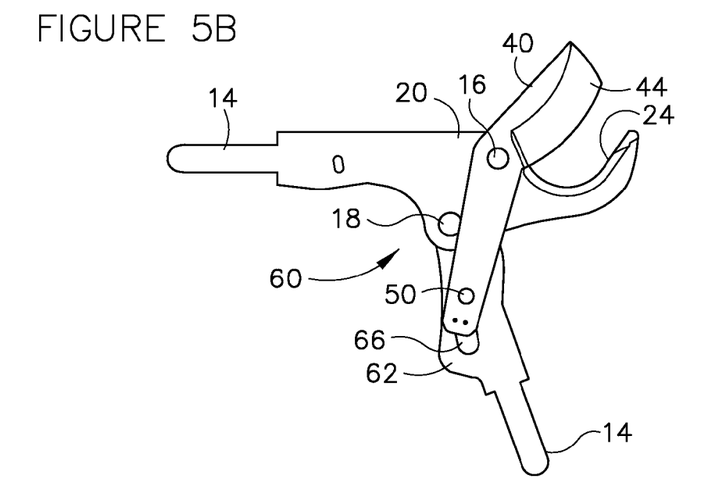
FIG. 5B is a schematic image of a leverage mechanism for a hand-operated cutting tool, such as a lopper, in a further open position according to the exemplary embodiment of FIG. 1B.
Figure 5C:
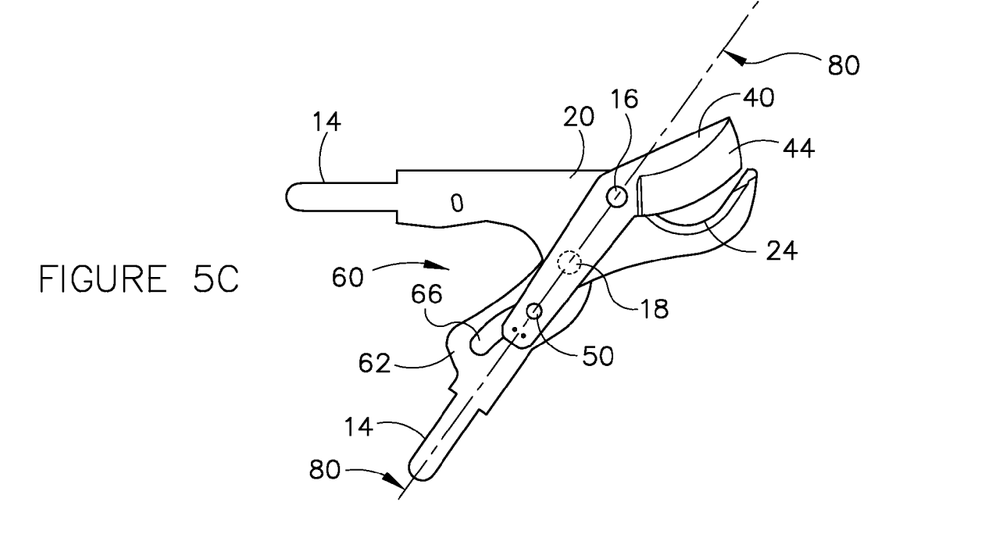
FIG. 5C is a schematic image of a leverage mechanism for a hand-operated cutting tool, such as a lopper, in a partially open position according to the exemplary embodiment of FIG. 1C.
Figure 5D:
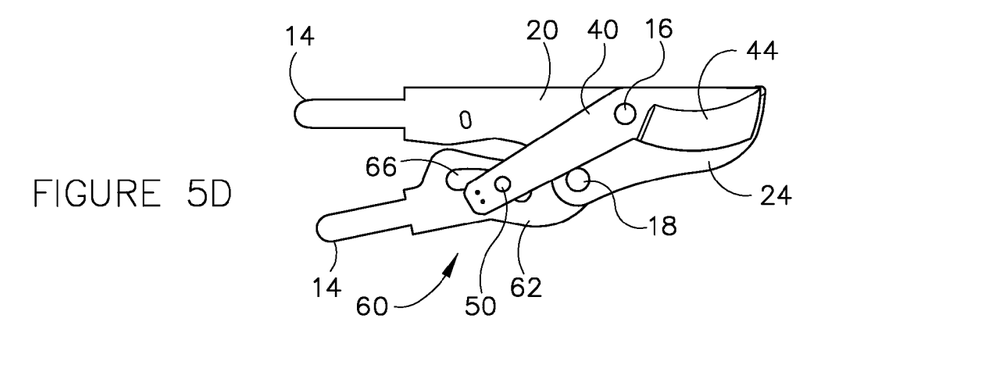
FIG. 5D is a schematic image of a leverage mechanism for a cutting hand-operated cutting tool, such as a lopper, in a full closed position according to the exemplary embodiment of FIG. 1D.
Figure 6:
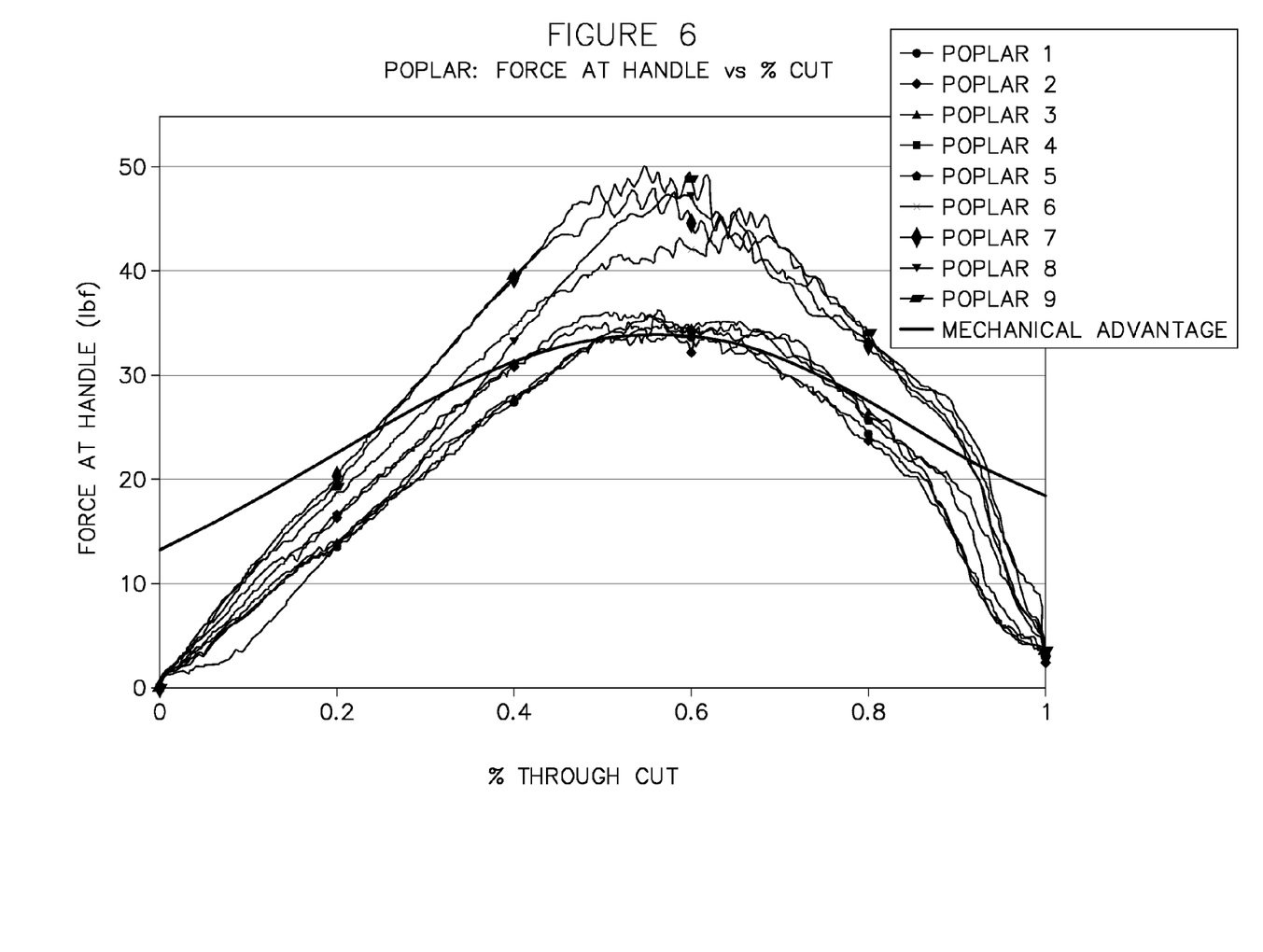
FIG. 6 is a graphical representation of force curve data for cutting an object comprising a first material, and a power curve representation of variable mechanical advantage provided by the variable leverage mechanism according to an exemplary embodiment.
Figure 7:
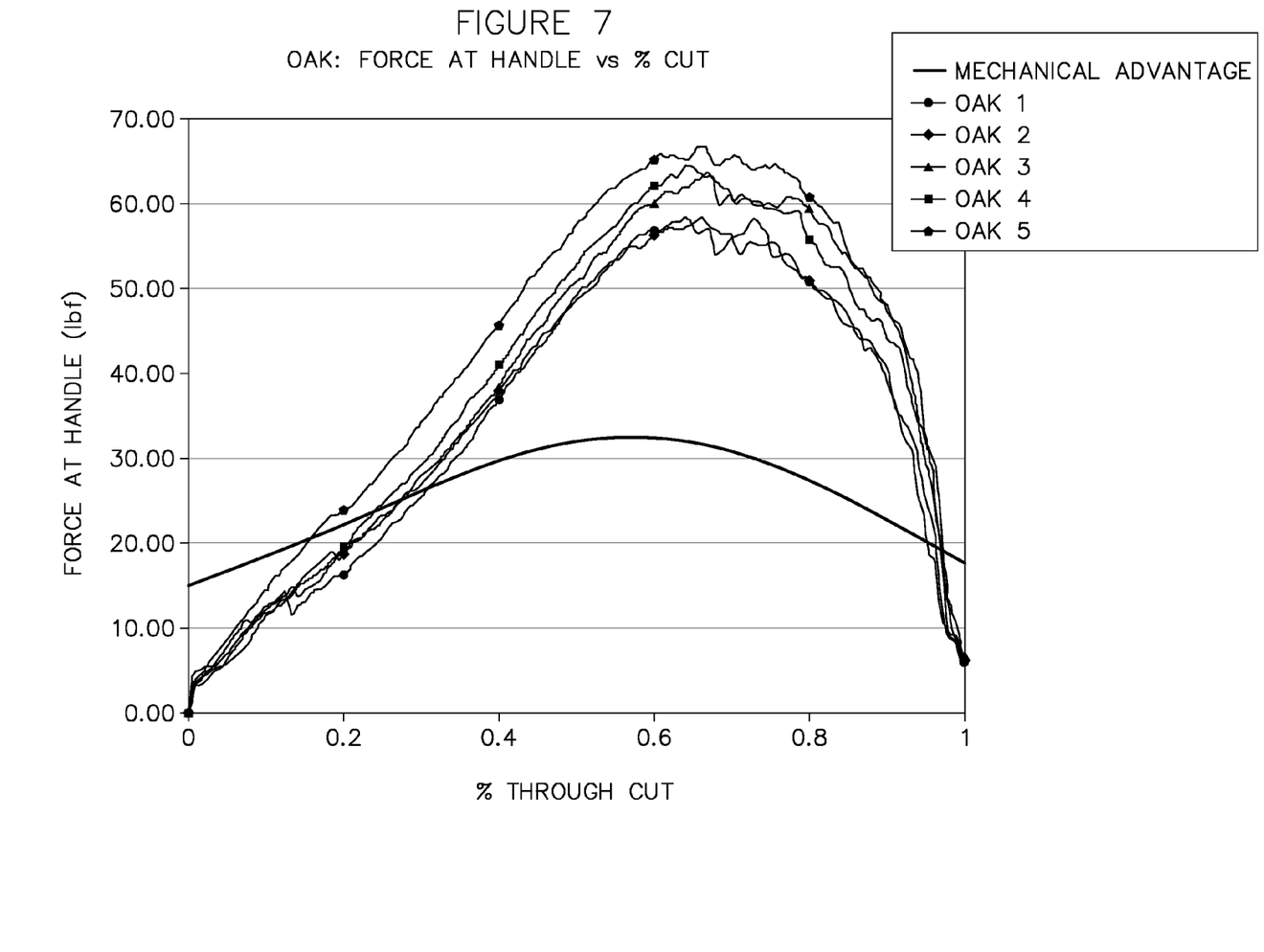
FIG. 7 is a graphical representation of force curve data for cutting an object comprising a second material, and a power curve representation of variable mechanical advantage provided by the variable leverage mechanism according to an exemplary embodiment.

Referring to FIGS. 5A-5D and 6-7, the operation of variable leverage mechanism 60 of the cutting tool 10 throughout the cutting stroke is shown according to an exemplary embodiment. The variable leverage mechanism 60 is intended to provide a variable mechanical advantage that results in a more uniform (e.g. more constant force) application by a user as the tool moves from the open position to the closed position during the cutting stroke to cut an object that offers a varying level of resistance through the cutting stroke. Referring to FIGS. 6 and 7, experimental data is shown representing the resistance force offered by two sets of objects throughout the cutting stroke of the cutting tool, and the variable mechanical advantage provided by the variable leverage mechanism 60 according to the embodiment of FIGS. 2-5D.

Referring to FIG. 6, the force applied by a user to the handles 12 of the cutting tool 10 throughout the cutting stroke that was required to cut nine generally cylindrical green growth poplar samples of various thicknesses is represented graphically as nine separate "force curves". Each force curve shows generally that the force required at the handles 12 to overcome the resistance needed to sever the samples begins at zero (0) (corresponding to the cutting tool in a full open position) and increases to a maximum at a point that is within a range of approximately 55-62 percent of the cutting stroke, and then decreases at a similar rate until a point that is within a range of approximately 90-95 percent of cutting stroke, after which the force drops rapidly until the cutting tool is in the full closed position.

Referring further to FIG. 6, the variable mechanical advantage provided by the variable leverage mechanism 60 using a lever device 62 with curved slot 66 is represented as a "power curve". As a point of reference, the Applicants note that a constant level of mechanical advantage throughout the cutting stroke would correspond to a horizontal line on the graph of FIG. 6. Likewise, lowering or raising the location of a user's hands on the handles (relative to the cutting members to gain or decrease mechanical advantage on the tool) would simply shift the power curve on the graph upward or downward, respectively. The power curve illustrates how the mechanical advantage provided by the variable leverage mechanism 60 increases as the force required to cut the poplar samples increases to a maximum (as shown by the inflection point of the power curve) at a point that is approximately 58-60% of the cutting stroke, and then decreases as the force required to cut the samples decreases until the samples are severed at the full closed position.

FIG. 7 provides a representation of the force applied by a user to the handles 12 of the cutting tool 10 throughout the cutting stroke that was required to cut samples of formed from a different wood material. In FIG. 7, five generally cylindrical oak samples are represented graphically as five separate force curves. In a manner similar to the representations for poplar shown in FIG. 6, each force curve shows generally that the force required at the handles to overcome the resistance needed to sever the oak samples begins at zero (0) (corresponding to the cutting tool in a full open position) and increases to a maximum at a point that is within a range of approximately 62-65 percent of the cutting stroke, which the Applicants believe reflects the force associated with cutting a 'harder' wood (i.e. because oak is harder than poplar and offers greater resistance to cutting). The force curves then decrease at a slower rate (compared to the poplar samples), which the Applicants believe is attributable to increased frictional force on the blade 44 as it wedges the sample wider through the remaining portion of the cut, until a point that is within a range of approximately 90-95 percent of cutting stroke, after which the force drops rapidly until the samples are severed with the cutting tool in the full closed position.

Referring further to FIG. 7, the power curve illustrates how the mechanical advantage provided by the variable leverage mechanism 60 with the lever device 62 having a curvilinear slot 66 is also tailored for use with 'harder' materials such as oak. The power curve is lower in the region surrounding its maximum than at the extremities of the curve. Additionally, the power curve at the start of the cutting stroke is lower than at the end of the cutting stroke. This allows for the power curve to meet the needs of a range of force requirements of various samples, including 'harder' materials such as oak.

The positioning and configuration of the curvilinear slot 66 results in a power curve that increases and decreases to correspond to the amount of force required by a user to cut a typical samples of various materials between the cutting members of the cutting tool. The resulting power curve thus permits a user to cut object of various materials using a more uniform (e.g. more consistent) amount of force throughout the cutting stroke as a user's arms move from an abducted position (e.g. elbows out in the example of a lopper) to an adducted position (e.g. elbows in for the example of a lopper).

The power curve of the variable leverage mechanism 60 results from the variable mechanical advantage produced by the lever device 62 having the curvilinear slot 66 that translatably engages the second cutting member 40 at a point of interaction along the slot 66, as shown in more detail in FIGS. 5A-5D. Referring to FIG. 5A, with the cutting tool 10 in the full open position, the projection 50 at the second end 46 of the second cutting member 40 engages the slot 66 at a point of interaction that corresponds to the second end center point 78 of the slot 66, which is also intended to provide a travel stop for the open position of the tool. As the cutting stroke begins and the cutting tool moves toward the closed position, the projection 50 pivotally and slidably translates along the slot 66 toward the first end center point 76 (see FIG. 5B). When the cutting tool reaches a point that is approximately 58-60 percent through the cutting stroke (see FIG. 5C), the projection 50 reaches the first end center point 76 of the slot 66, where the projection 50, and the first and second pivot points 16, 18 are aligned in a common plane 80 corresponding to maximum mechanical advantage (as represented by the peak on the power curve of FIGS. 6 and 7). As the cutting tool moves further toward the closed position to complete the cutting stroke, the projection 50 pivotally and slidably translates only a short distance back along the slot 66 from the first end center point 76, which corresponds to the slower rate of decrease in mechanical advantage (as represented in the power curves of FIGS. 6 and 7) provided in the remaining approximately 40% of the cutting stroke (see FIG. 5D).

According to any exemplary embodiment, a hand-operated cutting tool includes a pair of handles 12 operable to actuate a pair of cutting members 20, 40. A variable leverage mechanism 60 includes a lever device 62 with a curvilinear slot 66 (e.g. arcuate, curved, etc.). The lever device 62 is pivotally connected to a first cutting member 20 at a second pivot point 18 and is slidably connected to a second cutting member 40 along the slot 66. The configuration of the curvilinear slot 66 in the lever device 62 provides an increasing mechanical advantage through the portions of the tool's cutting stroke that correspond to increased force required to cut an object, and provides a decreasing mechanical advantage through the portions of the tool's cutting stroke that correspond to decreased force required to cut the object, so that the force required by a user to cut the object remains more consistent than the varying force typically required with conventional cutting tools to cut an object.

It is also important to note that the construction and arrangement of the elements of the hand-operated cutting tool, shown as a lopper, with a variable leverage mechanism having a lever device with curvilinear slot as shown schematically in the embodiments is illustrative only. Although only a few embodiments have been described in detail in this disclosure, those skilled in the art who review this disclosure will readily appreciate that many modifications are possible without materially departing from the novel teachings and advantages of the subject matter recited.

Accordingly, all such modifications are intended to be included within the scope of the present invention. Other substitutions, modifications, changes and omissions may be made in the design, operating conditions and arrangement of the preferred and other exemplary embodiments without departing from the spirit of the present invention. For example, the position and characteristics of the curvilinear slot on the lever device may be varied as necessary to accommodate changes in the dimensions, shape and geometry of the other components of the cutting tool. Also, the orientation of the projection extending from (or otherwise coupled to) the second end of the second cutting member and the curved slot in the lever device may be reversed, such that the curved slot is provided in the second cutting member and the projections extends from (or is otherwise coupled to) the lever. Further, the handles extending from the first cutting member and the lever device may be any suitable size and shape to correspond to the specific type of cutting devices and type of cutting tool (e.g. loppers, shears, pruners, trimmers, etc.).

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present invention as expressed in the appended claims.

What is claimed is:

1. A hand-operated cutting tool comprising:
   a first cutting member including first and second apertures;
   a second cutting member including a third aperture, the second cutting member at least in part overlying the first cutting member with the third aperture in general registry with the first aperture;
   a lever having a longitudinal axis, and including a fourth aperture and an arcuate slot, the arcuate slot having a first end center point and a second end center point, and the longitudinal axis extends through the arcuate slot and a center point of the fourth aperture;
   a first pivot connection between the cutting members at the first and third apertures;
   a second pivot connection between the lever and the first cutting member at the second and fourth apertures;
   a projection disposed on the second cutting member and extending through the arcuate slot for effecting a point of interaction between the lever and the second cutting member;

wherein a line extending between the center point of the fourth aperture and the first end center point of the arcuate slot defines a first angle with the longitudinal axis;

wherein a line extending between the center point of the fourth aperture and the second end center point of the arcuate slot defines a second angle with the longitudinal axis; and wherein the second angle is greater than the first angle.

2. The tool of claim 1 wherein the arcuate slot is defined by a radius that is substantially constant.

3. The tool of claim 1 wherein the arcuate slot is defined by a substantially constant radius within a range of approximately 2.5-3.0 inches.

4. The tool of claim 1 wherein the arcuate slot is defined by a radius that is variable.

5. The tool of claim 1 wherein the arcuate slot and the projection provide a maximum mechanical advantage when the cutting members are in a cutting stroke position within a range of approximately 55 to 65 percent travel.

6. A handle-operated cutting tool comprising:
first and second cutting members pivotally connected at a first pivot point;
a lever having a longitudinal axis and pivotally connected to the first cutting member at a second pivot point;
a curved slot disposed on the lever, the curved slot defining a first end center point and a second end center point, and the longitudinal axis of the lever extending through the curved slot and the second pivot point;
a projection disposed on the second cutting member and slidable in the curved slot for effecting a point of interaction between the lever and the second cutting member throughout a cutting stroke;
wherein a line extending between the second pivot point and the first end center point of the curved slot defines a first angle with the longitudinal axis, and a line extending between the second pivot point and the second end center point of the curved slot defines a second angle with the longitudinal axis; and
wherein the second angle is greater than the first angle.

7. The tool of claim 6 wherein the curved slot is defined by a radius within a range of approximately 2.5-3.0 inches.

8. The tool of claim 6 wherein one of the first and second cutting members comprises a hook and the other of the first and second cutting members comprises a blade.

9. A hand-operated cutting tool, comprising:
first and second cutting members pivotally connected at a first pivot point;
a lever having a longitudinal axis and pivotally connected to the first cutting member at a second pivot point;
a translatable curvilinear pivot connection between the lever and the second cutting member, the translatable curvilinear pivot connection comprising a curved slot on one of the lever and the second cutting member and a projection disposed on the other of the lever and the second cutting member, and the curved slot defining a first end center point and a second end center point;
wherein a line extending between the second pivot point and the first end center point defines a first angle with the longitudinal axis, and a line extending between the second end center point and the second pivot point defines a second angle with the longitudinal axis, with the second angle greater than the first angle;
wherein the projection is disposed proximate the first end center point of the curved slot to provide a maximum mechanical advantage when the cutting members are in a cutting stroke position within a range of approximately 55 to 65 percent travel; and
wherein the projection is disposed proximate the second end center point when the cutting members are in a full open position.

10. The tool of claim 9 wherein the projection is disposed intermediate the first end center point and the second end center point when the cutting members are in a full closed position.

11. The tool of claim 9 wherein the curved slot is defined by a radius that is substantially constant.

12. The tool of claim 9 wherein the curved slot is defined by a substantially constant radius within a range of approximately 2.5-3.0 inches.

13. The tool of claim 9 wherein the curved slot is defined by a radius that is variable.

14. The tool of claim 9 wherein one of the first and second cutting members comprises a hook and the other of the first and second cutting members comprises a blade.

* * * * *